United States Patent Office 3,207,408
Patented Sept. 21, 1965

3,207,408
APPARATUS FOR TREATING THE INTERIOR OF A TUBULAR ELEMENT
Paul Thome, Saint-Cloud, Henri Foulquier, Rueil Malmaison, and Jean Frehling, Paris, France, assignors to Commissariat à l'Energie Atomique, Paris, France
Filed Apr. 5, 1962, Ser. No. 185,397
7 Claims. (Cl. 228—29)

The present invention relates to apparatus for treating the interior of a tubular element and has for an object improvements therein. In particular it is an object of the invention to provide apparatus for treating a zone of revolution within a tubular element about the longitudinal axis thereof, particularly for coupling a second tubular element to the interior of the said first element by welding.

The apparatus according to the invention comprises a composite elongated body which is introducible within the tubular element, and carrying means for centering the body within the tubular element, a tool mounted on the end part of a member within said body, means for the remote control and radial displacement of the tool and for turning the assembly formed by at least the internal element of the assembly and the tool about the axis of the tubular element, and wherein said body comprises a plurality of concentric members including the internal member carrying the tool, and an external tubular member angularly displaceable about the said axis, with reference to a rotatable member for operating on some at least of the centering means.

The apparatus according to the invention is particularly useful for effecting a fluid-tight coupling between pipe elements by internal welding, the ends of said pipes to be coupled being inaccessible from the exterior due to the fact, for example, that they are embedded in a mass of concrete or because other elements located around the pipes prevent access thereto.

This requirement is present, for example, when it is desired to couple a metal tube, such as a fuel tube passing through the core of a nuclear reactor, to its service pipes: in fact these pipes are embedded in biological protection screens and their coupling zones with the tube are only accessible through the interior of these pipes; moreover, if the reactor has already been in operation (in the case of replacing a fuel tube), the radioactivity in the coupling zone attains a magnitude which make it dangerous to approach them.

In order that the invention may be more clearly understood, reference will now be made to the accompanying drawings which show a specific embodiment thereof by way of example and moreover illustrate some joints capable of being manufactured thereby, and in which.

Figure 1:
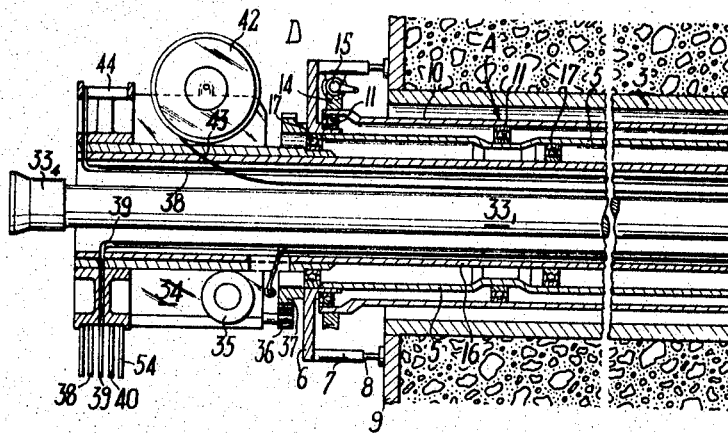
FIGURE 1 shows a remotely-controllable apparatus for internal welding and manufactured in conformity with the invention.
Figure 1:
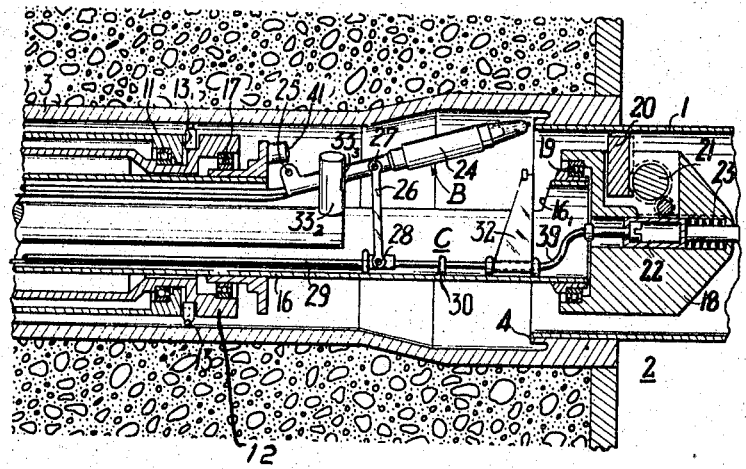

Referring now to the drawings, FIGURE 1 shows an apparatus for coupling a tube such as 1 by internal welding, the tube 1 being, for example a fuel tube which passes into the core of a nuclear reactor through a service pipe 3.

The end part of the tube 1 to be coupled is slid for a short depth into the enlarged end of the pipe 3, the interior diameter of which is of any convenient size. This end of the pipe has an internal axial edge and the end of the tube 1 is positioned adjacent this axial edge to form a pair of adjacent annular surfaces 4 which are easily accessible through the interior of the pipe.

The tubular portions to be welded about the pair of annular surfaces 4 are advantageously of a metal or an alloy such as stainless steel although the central portion of the tube 1 may be constituted of another metal or alloy, for example pure zirconium or an alloy thereof and having a small neutron absorption cross section. A composite tube of this type is described in French Patent No. 1,263,814.

The welding apparatus used comprises a hollow elongated support A, centering means locatable in the pipe, a tool B mounted on the said support and movable radially, an optical system C located in the interior of the support and permitting observation of the working zone from the exterior of the pipe, and a mechanism D for rotating the tool, its control means, and the optical system about the axis of the pipe.

The hollow support A comprises three tubular concentric members, all three generally being composite but they may be in a single piece.

The intermediate tubular member 5 is rotatively connected to the pipe 3 by means of a disk 6 fixed to the tube and carrying dowels 7 which slide axially on fingers 8 fixed, for example, by welding or screwing on a plate 9. This plate 9 may be integralised permanently with the pipe 3 but preferably it is secured thereto in such a manner that it may easily be removed therefrom.

Figure 5:
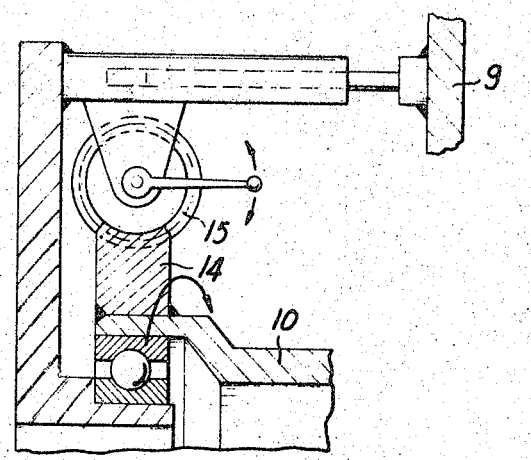
FIGURE 5 is an enlarged detail of a portion of FIG. 1 showing the mechanism for rotating the external tubular member.
Figure 6:
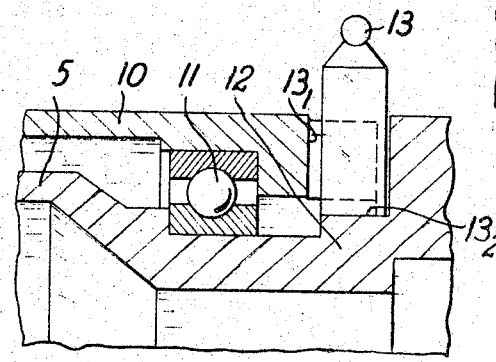
FIGURE 6 is an enlarged detail of a portion of FIG. 1 showing the means for centering the external tubular member.

The external tubular member 10 is centered on the member 5. Member 5 has at one of its ends a plate 12 (FIG. 6) provided with cam means comprising a circular groove $13_2$ whose depth is variable in order that the base thereof may present a spiral across section. On the base of groove $13_2$ stops 13 are mounted in radial guiding slots $13_1$ of the member 10 so that it may be rotatably driven thereby. Bearing 11 separates members 5 and 10. The other end of the member 10 carries a tangent wheel 14 rotated by a worm screw 15 mounted on the disk 6 (FIG. 5).

The internal tubular member 16, centred in the tube 5 by ball or needle bearings 17, carries at its end which is innermost with respect to the pipe 3, a bearing 19 upon which is mounted a centering head 18.

The head 18 is provided with three centering studs 20 which are radially movable in guiding recesses located mutually at 120° about the axis of the head. The projection and the withdrawal of these studs are controlled by a piston 22 coupled to the studs by a controlling mechanism of any desired kind such as a rack and pinion connection 21. The piston 22 is operated by the pressure of a fluid admitted by a conduit 39 and acting on the face of the piston in opposition to the force of a return spring 23 acting on the other face.

Figure 7:
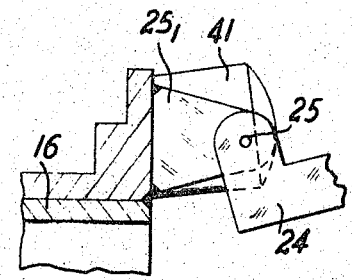
FIGURE 7 is an enlarged detail of a portion of FIG. 1 showing the mounting of the torch on the internal tubular member.
Figure 8:
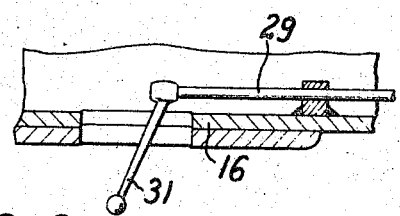
FIGURE 8 is an enlarged detail of a portion of FIG. 1 showing the means for actuation of the sliding rod.

The assembly comprising the tool and its control mechanism B, comprises the tool itself 24 which in this case is a welding torch and which is articulated at 25 (FIG. 7) on bracket 25, fixed to internal tube member 16 opposite a lateral opening $16_1$ provided in the member 16. This tool is oriented by a crank 26 articulated at 27 on the tool 24 and at 28 on a sliding rod 29. The rod is guided by ring 30 located along the internal wall of the member 16, and operable from the exterior by means of a control handle 31 (FIG. 8). This handle passes through an opening in member 16 as seen in the drawings.

A stop member 32 is secured to the end portion of rod 29. Upon rotation of the rod, the stop member may be moved from an angular position where it confronts the parts to be welded to another position where it is clear of the trajectory of the tool as shown in FIGURE 1; it allows the torch to be positioned before welding at a distance of a few tenths of a millimetre.

The optical system or endoscope C comprises an axial tube $33_1$ passing into the tubular member 16 and a radial tube $33_2$ projecting out of the window $16_1$ and having an observation aperture $33_3$. An eye piece $33_4$ carried by the end of the tube $33_1$ disposed outside the member 16 permits observation of the zone illuminated by a lamp 41.

At its end opposite the head 18, the internal tubular member carries the mechanism D which comprises a frame 34 upon which are mounted a motor 35 for driving a pinion 36 meshing with a gear wheel 37 integral with the disk 6 and thus not rotatable, the motor thus effecting rotation of the member 16 and the elements which it carries; a drum 42 rotated by a motor which is not shown, the metal wire 43 necessary for welding being coiled on this drum if use is made thereof; and a drum 44 carrying the different cables or feed conduits necessary: electrical cable 38 for supplying the welding torch and the motors, a conduit 40 for inert gas for the welding torch, a conduit 54 for cold water for cooling, etc. These cables and conduits pass through the member 16 through openings which are not shown and provided for this purpose in the wall and the hub of the drum.

The apparatus operates in the following manner:

Initially, the centering stops 13 and 20 are in the retracted position.

The apparatus is introduced into the pipe 3, head 18 foremost, until the member 32 comes into contact with the faces of the axial extensions to be coupled and juxtaposed about the circle 4. At this instant the fingers 8 are lightly engaged in the dowels 7 for rotatively immobilising the member 5; the head 18 is engaged in the tube 1 and the welding torch 24 is then located in the end enlargement of the pipe 3.

Compressed air is then admitted through the conduit 39 behind the piston 22 which is displaced so as to compress the spring 23, separates the centering studs 20 and centres the tubular member 16 in the tube 1. The worm screw 15 is also turned in the direction causing the separation of the stops 13 for centering the external tubular member 10 in the pipe 3.

By acting upon the handle 31 the member 32 is withdrawn and the torch 24 is angularly separated from the axis until its working axis cuts the circle 4 which can be inspected by observation through the endoscope.

The air in the welding zone is replaced by an inert gas admitted by the conduit 40 and then the motors for rotating the internal member 16 and the elements fixed thereto (particularly the torch), and the members for unrolling the drum for the deposition welding metal, are put into rotation whilst supplying electric current to the torch and the illuminating lamp.

The welding is automatically effected, preferably in accordance with the known technique of argon arc welding which allows the torch to be inclined to any extent desired. The quality of the work is visually under surveillance through the endoscope.

During the welding the torch may be cooled by cold water admitted through the conduit 54.

After welding it is sufficient to cut off the supplies and to carry out movements which are the opposite of those just described so far as the radial displacements of the torch, the centering studs 20 and the stops 13, are concerned, so as to be able to disengage the apparatus from the pipe 3.

It will be understood that the apparatus which has just been described may be utilised for effecting welding operations other than that of the tube 1 to the pipe 3 and which is easily disassembled.

Some examples of joints capable of being made by the apparatus described will now be given.

Figure 2:
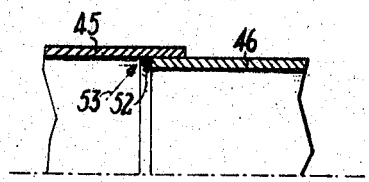
FIGURES 2, 3 and 4 show part axial sections of three embodiments of couplings for tubular elements made by using the said apparatus.
Figure 3:
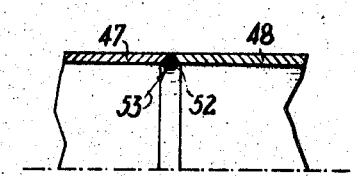
Figure 4:
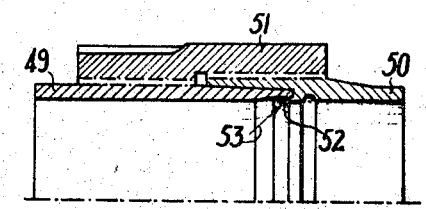

FIGURE 2 shows the coupling of two tubular members 45 and 46 of different diameters engaged and joined one within the other for a short length:

FIGURE 3 shows the coupling of two other tubular members 47 and 48 of the same diameter and butted end to end on either side of a fillet having a truncated conical shape:

FIGURE 4 shows the coupling of two other tubular members 49 and 50 interengaging by means of two complementary tapered portions; the mechanical strength of the coupling is ensured by a common external sleeve 51 and the welding only carries out the function of a seal.

In FIGURES 2, 3 and 4, 52 indicates the ribbon of welding metal and 53 is an arrow representing the direction of the internal welding arc.

The mechanism for rotating the tool about the axis of the assembly may be modified by the addition of a mechanism for axially moving the tool at the same time in such fashion that the tool may operate on not only a part of annular surfaces but also a cylindrical surface or a curve of any desired shape on such a surface: by such an embodiment it is possible to repair welding lips or to eliminate small amounts of play between tubular elements of different diameters.

Numerical indications relating to two welding operations carried out with apparatus according to the invention and having given every satisfaction will now be given purely by way of illustrative example.

*Example 1.*—Assembly by welding without welding wire, in a single pass, of two tubular elements such as 45 and 46 (FIGURE 2) in stainless steel 18/8. The internal and external diameters of the internal tube were respectively 100 and 106 mm., and those of the external tube 107 and 113 mm. The welding current strength was 157 A.; the angle of the axis of the torch with respect to the axis of the tube was 40°; the speed of rotation of the torch was 17 cm./min. The diameter of the electrode was 1.6 mm. and its distance from the welding line was about 3 mm.

*Example 2.*—A welding assembly with welding wire (stainless steel wire of 1.2 mm. diameter fed at a speed of 5.75 metres per minute) of two tubular elements such as 1 and 3 (FIGURE 1) in stainless steel 18/8. The internal and external diameters were respectively 104 and 114 mm. and those of the lips formed on the external tube were 115 and 125 mm. The welding current strength was 175 A.; the no-load voltage was 20 volts and the rate of argon flow was 22 litres per minute. The resistance of the joint obtained to breaking by tension was 70 tons.

What we claim is:

1. In welding apparatus for internally welding a tubular element to a second element having an opening coaxial with the tubular element, a tubular inner member for insertion into the tubular element, means for rotating said inner member about the long axis of the tubular element, a welding tool, means for mounting said welding tool on said inner member for rotation therewith and for pivotal movement with respect thereto about an axis transverse to the long axis of the tubular element, an intermediate tubular member spaced from and surrounding said inner member adapted to be secured against rotation with respect to the tubular element, an outer tubular member surrounding and concentric to said inner and intermediate members, means for rotating said outer tubular member with respect to said intermediate member, centering means supported on said intermediate member and means for actuating said centering means by relative rotation of said outer and intermediate members about the long axis of the tubular element.

2. Apparatus as claimed in claim 1, wherein means are included for rotating said outer member with respect to said intermediate member.

3. Apparatus as claimed in claim 1, wherein means are provided for displacing said members parallel to the long axis of the tubular element.

4. Apparatus as claimed in claim 1, including centering members carried by said inner member, said centering means and said centering members being disposed on opposite sides of said tool in the direction of the long axis of said inner member.

5. Apparatus as claimed in claim 1, including a drum receiving supply cables for the tool and a motor for rotating said inner member and structure secured to said inner member supporting said drum and said motor.

6. Apparatus as claimed in claim 1, wherein the tool consists of an electric welding torch.

7. Welding apparatus including a rotatable tubular inner member, means for rotating said inner member, a welding tool, means for connecting said tool to said inner member for pivotal movement of said tool about an axis transverse to the axis of rotation of said inner member, means for adjusting the angular position of said tool with respect to said inner member, an intermediate tubular member spaced from and surrounding said inner member, centering means carried by said intermediate member for movement transverse to the axis of rotation of said member, an outer tubular member spaced from and surrounding said inner member and said intermediate member, cam means on said intermediate member for actuation of said centering means upon rotation of said outer member and bearing means on said intermediate member rotatably supporting said inner member and said outer member with respect thereto.

References Cited by the Examiner

UNITED STATES PATENTS

| 1,869,351 | 7/32 | Lincoln | 219—60 |
| 1,917,901 | 7/33 | Rohlfing | 113—133 |
| 2,987,608 | 6/61 | Handwerk et al. | 219—60 |
| 3,009,049 | 11/61 | Stanley | 219—60 |
| 3,084,243 | 4/63 | Gotch | 219—60 |

WHITMORE A. WILTZ, *Primary Examiner.*

CHARLES W. LANHAM, MICHAEL V. BRINDISI,
*Examiners.*

UNITED STATES PATENT OFFICE
CERTIFICATE OF CORRECTION

Patent No. 3,207,408 September 21, 1965

Paul Thome et al.

It is hereby certified that error appears in the above numbered patent requiring correction and that the said Letters Patent should read as corrected below.

In the heading to the printed specification, after line 7 insert the following:

Claims priority, application France, Apr. 13, 1961, PV 858,664 --.

Signed and sealed this 10th day of May 1966.

(SEAL)
Attest:

ERNEST W. SWIDER
Attesting Officer

EDWARD J. BRENNER
Commissioner of Patents